United States Patent
Pionetti et al.

(10) Patent No.: US 9,156,967 B2
(45) Date of Patent: Oct. 13, 2015

(54) RIGID MATERIAL FOR HEAT-INSULATION AND/OR BUOYANCY FOR AN UNDERWATER PIPE

(75) Inventors: Francois-Regis Pionetti, La Baleine (FR); Damien Szyszka, Issy les Moulineaux (FR); Rami Chkir, Puteaux (FR)

(73) Assignee: Saipem S.A., Montigny Le Bretonneux (FR)

(*) Notice: Subject to any disclaimer, the term of this patent is extended or adjusted under 35 U.S.C. 154(b) by 0 days.

(21) Appl. No.: 14/006,920

(22) PCT Filed: Mar. 16, 2012

(86) PCT No.: PCT/FR2012/050553
§ 371 (c)(1),
(2), (4) Date: Sep. 23, 2013

(87) PCT Pub. No.: WO2012/131214
PCT Pub. Date: Oct. 4, 2012

(65) Prior Publication Data
US 2014/0014870 A1 Jan. 16, 2014

(30) Foreign Application Priority Data
Mar. 29, 2011 (FR) ...................................... 11 52574

(51) Int. Cl.
| | |
|---|---|
| *F16L 1/24* | (2006.01) |
| *C08K 7/28* | (2006.01) |
| *C08J 9/32* | (2006.01) |
| *F16L 59/14* | (2006.01) |
| *F16L 59/02* | (2006.01) |
| *E21B 17/01* | (2006.01) |

(52) U.S. Cl.
CPC ... *C08K 7/28* (2013.01); *C08J 9/32* (2013.01); *E21B 17/012* (2013.01); *F16L 1/24* (2013.01); *F16L 59/025* (2013.01); *F16L 59/14* (2013.01); *C08J 2375/04* (2013.01)

(58) Field of Classification Search
CPC ....................................................... E21B 17/12
See application file for complete search history.

(56) References Cited

U.S. PATENT DOCUMENTS

| | | | | | |
|---|---|---|---|---|---|
| 4,824,705 | A | * | 4/1989 | Persson et al. | 428/35.9 |
| 6,058,979 | A | * | 5/2000 | Watkins | 138/149 |
| 7,121,767 | B1 | * | 10/2006 | Watkins | 405/216 |
| 2003/0150504 | A1 | * | 8/2003 | Simon et al. | 138/149 |

(Continued)

FOREIGN PATENT DOCUMENTS

| | | |
|---|---|---|
| FR | 2 587 934 | 4/1987 |
| FR | 2 809 115 | 11/2001 |

(Continued)

*Primary Examiner* — John Kreck
(74) *Attorney, Agent, or Firm* — Cozen O'Connor (57) ABSTRACT

A rigid material for heat-insulation and/or buoyancy, consisting of a mixture of: (a) a matrix of a uniform cross-linked elastomeric polymer mixture and a liquid insulating plasticizer compound and (b) hollow balls dispersed in the matrix. The insulating plasticizer compound being selected from among compounds from inorganic or vegetable oil, and being a material, the phase of which does not change at a temperature of −10° to +150° C., the weight proportion of the insulating plasticizer compound in the matrix being at least 50%. The hollow balls, dispersed in the matrix are at a volumetric proportion of at least 35% of the total volume of the mixture of the balls with the matrix. The rigid insulating material can be used for the insulation and/or buoyancy of an underwater pipe or underwater-pipe element.

21 Claims, 4 Drawing Sheets

(56) References Cited

U.S. PATENT DOCUMENTS

| | | | |
|---|---|---|---|
| 2004/0026653 A1* | 2/2004 | Bonnet et al. | 252/62 |
| 2006/0182943 A1* | 8/2006 | Eyhorn | 428/304.4 |

FOREIGN PATENT DOCUMENTS

| | | |
|---|---|---|
| FR | 2 820 426 | 8/2002 |
| FR | 2 820 752 | 8/2002 |
| WO | WO 00/29276 | 5/2000 |
| WO | WO 02/34809 | 5/2002 |
| WO | WO 2004/003424 | 1/2004 |
| WO | WO 2006/136960 | 12/2006 |
| WO | WO 2009/138609 | 11/2009 |
| WO | WO 2010/065436 | 6/2010 |
| WO | WO 2010/097528 | 9/2010 |

* cited by examiner

RIGID MATERIAL FOR HEAT-INSULATION AND/OR BUOYANCY FOR AN UNDERWATER PIPE

PRIORITY CLAIM

This is a U.S. national stage of application No. PCT/FR2012/050553, filed on Mar. 16, 2012. Priority is claimed on France Application No.: FR1152574, filed Mar. 29, 2011, the content of which is incorporated herein by reference.

BACKGROUND OF THE INVENTION

1. Field of the Invention

The present invention relates to a rigid thermal insulation and/or buoyancy material for an undersea pipes and their accessories, such as valves and flow rate or pressure regulators, and in particular for undersea pipes conveying fluids that are hot or cold, preferably an undersea pipe for use at great depths, or indeed for bottom-to-surface connections between undersea wellheads and a storage and processing ship anchored on the surface.

In most industrial fields it is desired to have high performance insulation systems in order to maintain the fluids conveyed in pipework at constant temperature so that such transfers between pieces of equipment can be carried out over distances that are long, e.g. distances that may be as much as several hundreds of meters or even a few kilometers. Such distances are commonplace in industries such as oil refineries, liquefied natural gas installations (operating at −165° C.), and undersea oil fields that may extend over several tens of kilometers. Such oil fields are being developed in ever-increasing depths of water, which may be as much as 2000 meters (m) to 3000 m, or even more.

The present invention relates in particular to insulated undersea pipes installed on oil fields at very great depths, or indeed it also relates to bottom-to-surface connection pipes suspended between the sea bottom and a surface ship anchored on said oil field, and also to all types of accessory such as valves, flow rate or pressure regulators, etc.

2. Description of the Prior Art

Crude oil generally leaves a well head at a temperature lying in the range 45° C. to 75° C., or even more, and said well heads are often horizontally several kilometers away from the surface support that receives and processes the crude oil, whereas the water of the sea is at a temperature lying in the range about 3° C. to 5° C. Furthermore, the water depth may reach or exceed 2000 m to 3000 m so attempts are made to keep the crude oil until it reaches the surface at a temperature that is higher than 30° C. to 35° C. in order to avoid forming plugs of paraffin or gas hydrates, which would block production. This therefore requires continuous high performance thermal insulation of the pipe of the bottom-to-surface connection conveying the crude oil.

Numerous types of insulating pipe have therefore been developed, and in particular so-called pipe-in-pipe (PiP) type pipes comprising an inner pipe that conveys the fluid and an outer pipe coaxial around the inner pipe, also referred to as an "outer jacket", that comes into contact with the surrounding medium, i.e. water. The annular space between the two pipes may be filled with an insulating material, or it may be evacuated (i.e. contain no gas).

Such systems have been developed in order to achieve a high level of thermal performance and specific versions have been developed to operate more appropriately in great depth, i.e. to be capable of withstanding pressure at the sea bottom. The pressure of water is substantially 0.1 megapascals (MPa) (i.e. about 1 bar) for a depth of 10 m, so the pressure that the pipe must be capable of withstanding is thus about 10 MPa, i.e. about 100 bars, at a depth of 1000 m, and about 30 MPa, i.e. about 300 bars, at a depth of 3000 m.

Means are known for insulating external pipes that withstand high hydrostatic pressures and that are therefore suitable for use at great depths of immersion, which means are constituted by practically incompressible solid polymer material coatings based on polyurethane, polyethylene, polypropylene, etc., and that may be present, where appropriate, in the form of a solid tubular sleeve. However such materials present thermal conductivity and thermal insulation properties that are fairly poor, and not sufficient for avoiding the above-mentioned drawbacks associated with the formation of plugs in the event of production stopping in an undersea pipe conveying hydrocarbons.

Rigid insulating materials are also known that present advantageous buoyancy, being constituted by synthetic materials containing hollow microspheres (having a diameter of less than 0.1 millimeters (mm)) or hollow macrospheres (having a diameter lying in the range 1 mm to 10 mm) containing gas and capable of withstanding external pressure, that are embedded in binders such as an epoxy resin or a polyurethane resin, and known to the person skilled in the art as "syntactic" foam. Those syntactic foam insulating materials are used mainly for insulating undersea pipes at great depth, i.e. pipes of the riser or multiriser tower type, e.g. as described in WO 00/29276, WO 2006/136960, WO 2009/138609, or indeed WO 2010/097528. Those foams are extremely expensive to fabricate when they are for use at depths greater than 1000 m, i.e. when they need to withstand pressures of about 100 bars, i.e. 10 MPa, since the necessary microspheres must be sorted and tested in order to be capable of withstanding such pressures. In addition, the fabrication process is very difficult when it is desired to fabricate thick elements, since the curing of the chemicals used is a highly exothermic reaction. The main problem is to slow down the physicochemical reaction while simultaneously extracting the heat that is given off, so as to prevent the reaction from running away, which would run the risk of baking or even burning the bulk of the material, thereby generally leading to a material that is unsuitable for its intended use.

Furthermore, the main fabrication faults that are generally encountered are the result of poor control over the curing process, leading to internal deterioration of the polymer matrix, said defects not always being observable prior to installing and starting to use the undersea pipe. It is then found after a few months of operation at high temperature, and in particular for transferring oil at a temperature lying in the range 20° C. to 90° C. with a very great external pressure (10 MPa per depth of 1000 m of water), that cracks occur in the matrix of the polymer and that the microspheres are damaged, thereby leading not only to significant losses of insulation and losses of buoyancy, but above to the creation of cold points, where cold points are particularly troublesome in the event of production being stopped, since the crude oil then freezes very quickly at such cold points, thereby forming highly localized plugs of paraffin and gas hydrates that it is practically impossible to reabsorb in simple manner.

Those high performance rigid syntactic foam insulating materials are used for insulating the running length of pipes, whether the pipes are resting on the sea bottom or the pipes are bottom-to-surface connection pipes. In contrast, those rigid insulating materials are not easy to use for singular junction elements, sometimes known as "spool pieces", or "connection pieces", or indeed "bent junction pipes", since these pipe elements are generally complicated in shape, presenting a plurality of bends or curves, as described in WO 2010/063922, and they need to be fabricated after the undersea pipes have been laid and the bottom-to-surface connections have been installed.

Furthermore, insulating materials are known that are of greater thermal insulation capacity, i.e. of lower thermal conductivity, which materials are associated with phase change properties. Such insulating phase change materials (PCMB) are used in particular in WO 00/40886 and WO 2004/003424, however such insulating PCMB that are capable of adopting a liquid state need to be confined in an absorbent material, as described in WO 00/40886, or they need to be confined in pouches, as described in WO 2004/003424.

Phase change materials act as means for accumulating heat. They give back the accumulated energy on solidifying by crystallizing, or they absorb such energy on melting, with this process being reversible. These materials therefore make it possible to increase the duration of a stop in production without running the risk of the pipes clogging as a result of premature cooling of their content. Nevertheless, those phase change materials present the drawback of their viscous liquid state encouraging heat losses by convection. Another drawback of said insulating phase change materials is that they necessarily give rise to a change in the volume of the material during a change of phase, and that has consequences on the confinement jacket, which must be capable of accommodating such changes in volume.

Those confined thermally insulating coatings are themselves coated in a semirigid continuous tubular outer jacket. However in the prior art, the described embodiments are restricted to fabricating straight pipes and they are not easily adapted to fabricating pipes with bends as described above. Such embodiments are not easily adapted to making thermal insulation on bent junction pipes because of the structure of the outer jackets, since as described they are not suitable for being deformed so as to remain concentric relative to the inner pipe and they do not make it possible to obtain a substantially constant thickness for the insulating material, in particular in the bend regions.

Other insulating materials that are in the form of a gel have been described, in particular in patents FR 2 809 115, FR 2 820 426, and FR 2 820 752, in the name of the Applicant, and in WO 02/34809. More particularly, such insulating gels are constituted by a complex comprising a first compound presenting high grade thermal insulating properties and acting as a plasticizer, which is mixed with a second compound that provides a structuring effect, in particular by curing, such as a polyurethane compound, with the mixture ending up, after the second compound has cured, as an insulating gel constituted by a matrix of said second compound confining said insulating first compound, the insulating gel as finally obtained greatly reducing convention phenomena, in particular in the event of the first compound being a phase change compound.

Said first compound may itself be a phase change compound such as paraffin, other compounds in the alkane family, such as waxes, bitumens, tars, fatty alcohols, glycols, and still more particularly any compound having a melting temperature lying between the temperature $t_2$ of the hot effluents flowing in the inner pipe and the temperature $t_3$ of the medium surrounding the pipe in operation, i.e. in general a melting temperature lying in the range 20° C. to 80° C.

However said first compound may be an insulating compound that does not change phase, such as kerosene, in an intimate homogeneous mixture with a polyurethane polymer, such that together they are in the form of a gel, as described in WO 02/34809.

In prior embodiments, as a result of their extremely flexible elastomer structure and of their relatively fragile mechanical strength, such gels are fully confined by a flexible or semirigid protective jacket, in particular between an inner pipe made of steel and an outer pipe made of thermoplastic material, both in rectilinear pipe portions and in bent pipe portions, and in particular for the bent junction pipes described above.

In order to do this, preconstituted tubular jackets are prepared that are threaded onto a coaxial inner pipe, and the gel is injected into the annular space after the ends of said annular space between said tubular jackets and inner pipes have been shut off. Other methods of making PiP type coaxial bent junction pipes are described in patent WO 2010/063922.

Such insulating gels thus present the advantage of improved thermal insulating properties, while being easier to work than solid insulating materials, in particular with respect to bent junction pipes or indeed to thermal insulation sleeves as described in WO 2010/049627.

The mechanical strength of such gels is nevertheless not sufficient for them on their own to be capable of withstanding the mechanical stresses on the pipes while they are being handled during manufacture, transport, and installation in site, and indeed throughout their lifetime.

Another drawback of such insulating gels is that said first compound, such as kerosene, tends to be exuded from the cured polymer matrix over its lifetime.

SUMMARY OF THE INVENTION

The object of the present invention is to provide a novel thermal insulation material presenting improved thermal insulating properties, and where appropriate improved buoyancy properties.

Another object of the present invention is to provide a novel thermal insulation and/or buoyancy material that presents considerable mechanical strength, like the syntactic foams of the prior art, but that does not present the risk of cracking and deteriorating over time due to potential curing defects, as described above.

Another object of the present invention is to provide a thermal insulation material that is very easy to fabricate and to work, in particular by in situ casting into a mold, in order to form molded parts in a preconstituted protective jacket, suitable for being placed around an undersea pipe, or else cast directly into the annular space between coaxial pipes, like the insulating gels described in the above-mentioned prior art, and more generally presenting advantages suitable for an application to thermally insulating a bent junction pipe.

Another object of the present invention is to provide a thermal insulation material and/or a buoyancy material presenting improved stability in composition and in thermal and mechanical properties over time.

In the present invention, it has been discovered that it is possible to obtain a rigid thermal insulation and buoyancy material that is practically incompressible in a manner similar to or even better than that of seawater, while also presenting improved properties of thermal insulation, of buoyancy, and of ease of working, in accordance with the object of the present invention, by using a viscous insulating gel composition of the kind described in WO 02/34809, and by mixing it with hollow microbeads prior to curing said gel, providing that the components of said insulating gel and their mass proportions relative to the microbeads are appropriately selected, as defined below.

More precisely, the present invention provides a rigid thermal insulation and/or buoyancy material characterized in that it is constituted by a mixture of:

a) a matrix of a homogeneous mixture of cured elastomer polymer and a liquid insulating plasticizer compound, said insulating plasticizer compound being selected from compounds derived from mineral oil, preferably hydrocarbons, and compounds derived from vegetable oils, preferably esters of vegetable oils, said insulating plasticizer compound not being a material of the type that changes phase at a temperature lying in the range −10° C. to +150° C., the mass proportion of said insulating plasticizer compound in said matrix being at least 50% and preferably at least 60%; and b) hollow beads, preferably glass microbeads, dispersed within a matrix of said homogeneous mixture of said polymer and said insulating plasticizer compound, at a proportion by volume of at least 35% of the total volume of the mixture of said beads with said matrix, and preferably lying in the range 40% to 65% of said total volume.

A material of the present invention presents properties of thermal insulation, of buoyancy, and of resistance to cracking that are increased, and it also presents a cost that is lower than that of a syntactic foam material made of the same ingredients but without the plasticizer compound, as explained below.

The insulating gels described in document WO 02/34809 serve essentially to confer thermal insulation while also providing a high degree of resistance to compression as a result of their practically-incompressible nature, regardless of the level of pressure, i.e. down into the abyss (−10,000 m), or even deeper.

Under such circumstances, it was not obvious to add hollow microbeads within such an insulating gel of the type of WO 02/34809, insofar as said hollow microbeads are liable to implode when their mechanical strength pressure limit is reached. The mixture of the WO 02/34809 insulating gel with hollow microbeads in accordance with the material defined in claim 1 of the present application presents a certain amount of rigidity and loses its incompressible nature as a result of the presence of the hollow microbeads.

Furthermore, it was not obvious that the thermal insulation properties of a material of the present invention, as compared with the same proportion of a syntactic foam comprising the same polymer with the same content of hollow microbeads, would present any improvement as is found in the present invention using hollow microbeads in accordance with the definition of the present invention.

The inventors have discovered, accidentally, that mixing such an insulating gel with hollow microbeads presents an advantage that is unexpected and non-obvious in that its buoyancy does not decrease with depth, and sometimes even increases, whereas on the contrary the buoyancy of a syntactic foam material (a similar material but without the plasticizer compound) decreases in very significant manner with increasing depth of water.

This increased buoyancy as a function of depth stems from the fact that bulk modulus of said rigid insulating material of the invention is greater than the bulk modulus of water, i.e. greater than 2200 MPa, the bulk modulus of water being around 2000 MPa.

In other words, the increase in buoyancy of said material results from the density of water increasing more than the density of said material as a function of the depth at which the material is to be found.

Consequently, the rigid insulating material of the invention, also known as glass bubble gum (GBG), presents much higher performance in terms of buoyancy at great depths, in particular at depths in the range 1000 m to 3500 m and beyond, in comparison with a prior art syntactic foam (a material that is similar but without the plasticizer compound) for which the bulk modulus does not exceed 1600 MPa (see Example 3 below).

Furthermore, as explained in the description, in the event of a high level of compression at great depth, the matrix of that syntactic foam is observed to crack and its microbeads are observed to break on coming into contact one against another, whereas in the material of the present invention, rupturing of the microbeads occurs at a compression value, and thus a water depth, that is 15% to 30% greater than that of the conventional syntactic foam.

The advantageous technical effects of the plasticizer compound with respect to the properties of the microbeads constitute novel technical effects of the plasticizer compound that are neither described nor suggested in either of the two documents WO 02/34809 and FR 2 587 934.

Although the inventors do not desire to be bound to any particular theory, they believe that these advantageous technical effects can be explained by the fact that a film of plasticizer compound remains continuously on the surfaces of the microbeads: the microbeads are always separated from one another by a fine layer of polymer and plasticizer compound mixture, which then acts as a cushion or a damper in the event of large pressure variations, such that the stress concentration phenomenon that exists in the syntactic foam and that leads to the matrix cracking and to the microbeads breaking does not occur in the material of the invention.

Finally, the cost of a material of the present invention is much lower than that of prior art syntactic foams insofar as said plasticizer compound is much less expensive than said polymer constituting the matrix.

Overall, the material of the present invention provides better properties in terms of ability to withstand cracking and in terms of increased buoyancy at great depth, associated with lower cost than a comparable syntactic foam material (using similar ingredients but without the plasticizer compound).

The very great and unexpected advantages that result from the novel composition of the material of the present invention as defined above are explained below.

Herein, the term "thermal insulation" is used to mean a material having thermal conductivity properties of less than 0.25 watts per meter per kelvin (W/m/K) and the term "positive buoyancy" means density of less than 1000 kilograms per cubic meter ($kg/m^3$).

The term "rigid material" is used herein to mean a material that keeps it shape on its own and that does not deform significantly as a result of its own weight when performed by molding or when confined in a flexible jacket, and in which Young's modulus λ is greater than 200 MPa, unlike a gel, which remains extremely flexible and which has a Young's modulus that is practically zero.

It can be understood that the molecules of said plasticizer compound are miscible with, i.e. compatible in terms of polarity, and chemically inert relative to said polymer and the monomer and/or mono- or multi-functional pre-polymer components on being mixed therewith prior to curing, the mixture forming a composition that is curable by said components of said polymer reacting by being mixed together, the molecules of said insulating plasticizer compound being held captive and dispersed within a cured three-dimensional array of said polymer as curing of the array progresses after said ingredients have been mixed together, thereby preventing or at least diminishing the exuding and/or convection and/or percolation of said insulating plasticizer compound out from the matrix after curing.

It can thus be understood that, in conventional manner, said matrix comprising a homogenous mixture of polymer and plasticizer compound fills all of the interstices between the microbeads.

The term "mineral oil" is used herein to mean a hydrocarbon oil derived from fossil material, in particular by distilling crude oil, coal, and certain bituminous schists, and the term "vegetable oil" is used to designate an oil derived from plants by extraction, in particular rapeseed oils, sunflower oils, or soybean oils, and more particularly by treatment of the esters of such vegetable oils.

In known manner, the hollow beads are filled with a gas and they withstand the hydrostatic external pressure under the sea. They have a diameter lying in the range 10 micrometers ($\mu$m) to 10 mm with microbeads having a diameter lying in the range 10 $\mu$m to 150 $\mu$m, and preferably in the range 20 $\mu$m to 50 $\mu$m, with a wall thickness of 1 $\mu$m to 2 $\mu$m, and preferably of about 1.5 $\mu$m. Such glass microspheres are available from the supplier 3M (France).

More particularly, in order to make an insulating material of the present invention, also referred to below by the abbreviation GBG (glass bubble gum), capable of withstanding a depth of 2500 m, i.e. a pressure of about 25 MPa, it is advantageous to use a selection of microbeads having a Gaussian distribution centered on 20 $\mu$m, whereas for a depth of 1250 m, a Gaussian distribution centered around 40 $\mu$m suffices.

The phase stability of the plasticizer compound of the invention at temperature values in the range $-10°$ C. to $+150°$ C. makes it compatible with the temperature values of seawater and of petroleum fluids produced by great depths.

As explained below, the rigid insulating material of the present invention, although relatively "rigid" in the meaning of the present invention, presents mechanical behavior in terms of compressibility that approaches an elastomer gum because of the low value of its Young's modulus, whereas a syntactic foam behaves like a solid.

The "rigidity" in the meaning of the present invention of the insulating material results essentially from its high mass content of said microbeads, said microbeads also contributing additional buoyancy and thermal insulation compared with an insulating gel having the same composition.

A rigid thermal insulation and/or buoyancy material of the present invention presents properties of buoyancy, of thermal insulation, and of mechanical strength, and in particular of quasi-incompressibility, that are better than those of conventional syntactic foams and insulating gels of the prior art because of the improved thermal insulation properties and because of the density values that are lower for said insulating plasticizer compound ingredients that it contains in the polymer matrix.

Furthermore, because of the plasticizing nature of said insulating plasticizer compound, the curing reaction of the polymer of the matrix presents an exothermic nature that is attenuated, or at least the convection and the removal of the heat given off during the curing process do not lead to deterioration and/or non-uniformities in the bulk of the matrix, either while the curing process is taking place or subsequently, with this being particularly appreciable with large thicknesses of the material.

In this respect, it should be observed that an essential advantageous technical function of said polymer of the matrix is to reduce convection phenomena, by preventing molecules of said insulating plasticizer compound from moving.

Another essential advantage of the rigid thermal insulation and/or buoyancy material of the present invention is its relative cost, which is much less than that of prior art syntactic foams insofar as the use of said insulating plasticizer compound represents a significant reduction in cost compared with a material comprising exclusively a polymer matrix, given that said cured polymer materials are more expensive than the liquid plasticizer compound of the present invention.

Finally, because of the properties of said insulating plasticizer compound in the specific temperature range, and also because of the glass transition temperatures of said polymer, the thermal insulation material of the present invention can be used for conveying hot fluids, such as in particular production oils at temperatures that may lie in the range $-10°$ C. to $+150°$ C., and it can thus to do so in cold seawater, as is the case for seawater at great depth, where the water temperature lies in the range about $2°$ C. to $4°$ C.

Another advantage of the rigid material of the present invention, compared in particular with the insulating gel of the prior art, lies in that said insulating plasticizer compound is held captive to a greater extent in the polymer matrix, which presents increased stability over time in terms of composition, less of said plasticizer compound being exuded out from the matrix because said insulating plasticizer compound is held more firmly captive in said solidified polymer matrix than it is held in the insulating gel of the prior art. This gives rise to a smaller thermal convection property for said insulating rigid material compared with the insulating gel of the prior art.

It should be observed that homogeneous mixtures of polymers and of insulating plasticizer compounds used in the rigid material of the present invention have already been used in the form of insulating gels in WO 02/34809, but it has never been envisaged or suggested that it was possible to formulate them in a mixture with hollow microbeads in order to obtain advantageous rigid materials in accordance with the present invention, particularly given that such insulating gels were sought after essentially for their high resistance to compression as a result of their practically-incompressible nature regardless of the level of pressure, i.e. down to the abyss ($-10,000$ m), which incompressible nature is not to be found in the rigid material of the present invention because of the presence of hollow microbeads that are subject to implosion once their mechanical strength limit pressure is exceeded.

More particularly, the rigid insulating material of the present invention presents: density of less than 700 kg/m$^3$, preferably of less than 600 kg/m$^3$; and thermal conductivity of less than 0.15 W/m/K, preferably less than 0.13 W/m/K; with a Young's modulus or three-axis compression modulus lying in the range 100 MPa to 1000 MPa, preferably in the range 200 MPa to 500 MPa; and a bulk modulus greater than 2000 MPa, preferably greater than 2200 MPa, i.e. a bulk modulus greater than that of water.

It should be observed that no thermal insulation and/or buoyancy material of the prior art presents the combined characteristics of buoyancy, of thermal insulation, and of compressibility as defined above.

In comparison, the same material without microbeads is in the form of an insulating gel having thermal conductivity greater than 0.13 W/m/K.

Still more particularly, the rigid insulating material of the present invention, abbreviated below as "GBG", presents a three-axis compression elasticity modulus, or Young's modulus, that lies in the range 100 MPa to 1000 MPa, and preferably in the range 200 MPa to 500 MPa, while the bulk modulus of the GBG is similar to or even greater than that of seawater, which presents compressibility of the order of 2100 MPa to 2200 MPa depending on salinity and temperature. Thus, at great depths, the density of seawater increases more quickly than the density of GBG, and thus the buoyancy of said GBG is either independent of depth in water, or else increases a little with increasing depth. In contrast, a prior art polyurethane or epoxy syntactic foam presents a Young's modulus that is close to its bulk modulus, having a value of about 1500 MPa to 1600 MPa and its buoyancy therefore decreases significantly with increasing depth. Consequently, the rigid insulating material of the invention, or GBG, provides much better performance in terms of buoyancy and insulation than do prior art syntactic foams, with this being even more accentuated with increasing depth of water, i.e. at depths lying in the range 1000 m to 3500 mm, or more.

The better performance of the GBG of the invention is due to the fact that the bulk modulus of the plasticizer compound is very high, whereas that of the elastomer polymer is rather low, thereby drastically increasing said bulk modulus of GBG. Thus, a syntactic foam behaves like a solid, whereas the rigid insulating material or GBG of the present invention behaves like a flexible elastomer because of the low value of its Young's modulus.

The rigid insulating material of the present invention is thus better at withstanding compression than is a syntactic foam having the same polymer composition and the same proportion of the same microbeads at undersea hydrostatic pressure stress levels, where a said syntactic foam becomes damaged and cracked. It appears that this is associated with the physicochemical properties of said plasticizer compound. More precisely, the oily plasticizer compound increases the adhesion of the matrix to the surface of said microbeads, and said microbeads are permanently covered in a film of said polymer matrix and of said plasticizer compound, with this continuing even in the event of a high level of compression. Thus, a rigid insulating material of the present invention is better at withstanding compression than is a syntactic foam, and it does so without cracking and without losing thermal insulation and/or buoyancy as results from microbeads breaking, i.e. without breaking microbeads for a compression value, and thus for a water depth, that is 15% to 30% greater than that of a conventional syntactic foam. In a syntactic foam, in the event of a high level of compression and of the matrix cracking, it is observed that adjacent microbeads come directly into contact with one another and break, whereas in the material of the invention, that phenomenon requires higher levels of compression, very likely because the microbeads remain completely coated over their entire surfaces in a layer of the mixture of said matrix.

The mechanical behavior of the rigid insulating material of the present invention, or glass bubble gum (GBG), is quite different from that of a polyurethane or epoxy syntactic foam. In a syntactic foam, the glass microbeads trapped in the polymer matrix serve mainly to create perfectly spherical microcavities, which microcavities withstand implosion because of the stiffness of the impregnation resin, either a polyurethane or an epoxy. Thus, during impregnation of the microspheres, they make point contacts with one another. When the polymer foam is subjected to a high level of external pressure, it follows that said rigid resin is subjected to significant amounts of deformation and behaves like a solid, leading to local stress concentrations, which generally occur in very localized manner, thereby leading to destruction of the microspheres in said zone, and then to deformation of the microcavities, and finally to the collapse of the structure of the syntactic foam in this small localized zone. The process then propagates in general over distances that may be large and with insulated pipes, localized collapses are then seen to appear or else cracks appear in the insulating coating, which cracks may be several centimeters or even several decimeters in length, sometimes extending all around said pipe.

In contrast, the behavior of the rigid insulating material of the present invention, or GBG, is very different, since it behaves like a flexible elastomer and not like a solid because of the large amount of plasticizer compound in the final product and because of the its physicochemical properties as a compound derived from mineral or vegetable oil. The rigid insulating material retains a high level of internal flexibility, and thus great capacity for deforming locally. Thus, when the external pressure P increases, all of the inside volume of said matrix of rigid insulating material, or GBG, is substantially at said pressure P, and each of the microspheres is in intimate contact with the compound of the matrix, polymer and plasticizer compound. Direct contact between two or more microspheres then no longer takes place at isolated points as in a syntactic foam, since the microbeads continue to be separated by the mixture of polymer and plasticizer compound which then acts as a cushion or a damper during sudden changes of pressure, e.g. changes due to an external impact under the pressure P corresponding to the depth at which said insulating material, or GBG, is to be found. Thus, in the rigid insulating material of the invention, or GBG, the stress concentration phenomenon that exists in syntactic foam does not occur. The insulating plasticizer compound in the rigid insulating material of the present invention thus performs a novel technical effect.

Thus, more particularly, said microbeads are in direct contact with one another, but their outside surfaces remain entirely coated at least in a film of the mixture of said matrix, said mixture occupying in full the interstices between said microbeads. The matrix film is easily deformed.

More particularly, said plasticizer compound presents a bulk modulus greater than that of said polymer, preferably greater than 2000 MPa, and thermal conductivity, and also density, that are less than those of said polymer, preferably thermal conductivity of less than 0.12 W/m/K and density of less than 850 kg/m$^3$, and more preferably lying in the range 600 kg/m$^3$ to 820 kg/m$^3$.

More particularly, a rigid insulating material of the present invention presents the following characteristics:
- the mass ratio of said cured polymer and said insulating plasticizer compound lies in the range 15/85 to 40/60, and preferably in the range 20/80 to 30/70; and
- the volume ratio of said microbeads relative to the volume of said matrix of cured polymer and said insulating compound lies in the range 35/65 to 65/35, preferably in the range 40/60 to 60/40, and more preferably in the range 45/55 to 57/43.

With more than 85% of plasticizer compound in the matrix, the compound runs the risk of being exuded out from the matrix.

Also advantageously, said polymer presents a glass transition temperature lower than −10° C., so its phase stability is thus compatible with the temperature values of seawater and of production petroleum fluids at great depths.

More particularly, these comparative properties of compressibility and of thermal insulation and of density between said plasticizer compound and said polymer are satisfied when, in accordance with a preferred embodiment, said cured polymer is of the polyurethane type and said liquid plasticizer compound is a petroleum product known as a fuel type light cut.

Insulating plasticizer compounds of this type present the additional advantage of costing one-fifth to one-tenth the cost of polymers such as the polyurethane used in conventional syntactic foams.

Still more particularly, said plasticizer compound is selected from kerosene, gasoil, gasoline, and white spirit.

These fuels, with the exception of gasolines, also present the advantage of having a flashpoint that is higher than 90° C., thereby avoiding any risk of fire or explosion in the manufacturing process.

Kerosene presents thermal conductivity of about 0.11 W/m/K.

In another embodiment, a plasticizer compound is used that is derived from vegetable oil of the biofuel type, preferably an ester of an oil of vegetable origin, in particular an alcohol ester of a vegetable oil, of rapeseed, of sunflower, or of soybean.

More particularly, said polymer is a polyurethane that results from cross-linking polyol and polyisocyanate, said polyol preferably being of the branched type, still more preferably of the type comprising at least a three-branch star, with the polyisocyanate being an isocyanate pre-polymer and/or a polyisocyanate polymer.

Still more particularly, said polyurethane polymer is the result of polyaddition cross-linking of hydroxylated polydiene, preferably hydroxylated polybutadiene, and of aromatic polyisocyanate, preferably 4,4'-diphenyl-methane-diisocyanate (MDI) or a polymeric MDI.

Preferably, the NCO/OH molar ratio of the polyol component and of the polyisocyanate component lies in the range 0.5 to 2, and is preferably greater than 1, still more preferably lies in the range 1 to 1.2. Excess NCO guarantees that all of the OH reacts and that curing is complete, or at least optimized.

Advantageously, said material is confined in a protective jacket.

The outer jacket may be made of metal, such as iron, steel, copper, aluminum, or of metal alloys, or it may equally well be made of a synthetic polymer material such as polpropylene, polyethylene, polyvinylchloride (PVC), polyurethane, or any other polymer can be transformed into tubes, plates, or jackets, or that can be obtained by rotomolding thermoplastic powders, or indeed it may be made of composite material. The above-mentioned option of jackets made of polymer materials is particularly practical and effective since the invention, by making it possible to obtain the rigid insulating material of the invention, thus makes it possible to use jacket materials that are less rigid, lighter in weight, and less difficult to work, and consequently generally less expensive.

Preferably, the outer jacket is a more or less rigid thick layer having a thickness lying in the range a few millimeters to several centimeters, but it could also be in the form of a film that is flexible or semirigid.

The empty space between the fluid transport pipe and the outer jacket, in which the rigid insulating material of the invention is to be applied, may vary and may be defined as a function of the desired degree of insulation, as calculated on the basis of the insulation coefficient of the rigid insulating material of the invention and as a function of the temperatures to be maintained, or as a function of the desired buoyancy calculated on the basis of the density of the rigid insulating material of the invention.

More particularly, said rigid insulating material is in the form of a premolded part, preferably suitable for being applied around an undersea pipe or an undersea pipe element in order to provide thermal insulation and/or buoyancy, and withstanding underwater hydrostatic pressure, preferably at a great depth of at least 1000 m.

In another embodiment, said rigid insulating material of the invention is not premolded, but is molded in situ by casting before curing as explained in the method of the invention set out below.

In a manner known to the person skilled in the art, the setting time, i.e. the time needed for the composition of the present invention to be completely cured, may vary to a large extent. Nevertheless, the setting time can be adjusted, in particular by using a certain quantity of curing catalyst in order to obtain an appropriate setting time.

The present invention also provides a method of preparing a rigid insulating material of the invention, the method being characterized in that the following steps are performed:

1/ mixing said insulating liquid compound and the monomers and/or prepolymers suitable for reacting in particular by polyaddition to form said cured polymer, until a homogeneous mixture is obtained, preferably under a vacuum, i.e. by evacuating air and any other gas vapors, in order to obtain a degassed mixture; and 2/ mixing a homogeneous mixture of step 1/ with said microbeads in order to obtain a homogeneous mixture, in particular of fluid to pasty consistency, preferably under a vacuum; and 3/ leaving said mixture of step 2/ to rest so that the reaction to being completely cured forms a said rigid thermally insulating material, preferably with stoning at a temperature in the range 18° C. to 30° C. for at least 24 hours (h), and more preferably in the range 24 h to 72 h.

Evacuating air serves to obtain a mixture that is degassed, which is advantageous since the rigid insulating material of the invention is then practically-incompressible and presents a bulk modulus of about 2200 MPa, whereas the presence of microbubbles of air or gas would lead to the material shrinking severely as soon as it was subjected to an external pressure, and thus as soon as it was taken to great depths beneath sea level.

More particularly, and as mentioned above, in step 3/, the following successive steps are performed:

3a/ casting or injecting said mixture of step 2/ into a jacket acting as a mold or into a space formed by a) the outside surface of a pipe element or an undersea pipe to be insulated and/or for which it is desired to increase buoyancy, and b) the inside surface of a said protective jacket; and then 3b/ leaving said mixture to rest in said jacket until it has cured and solidified completely in situ.

Advantageously, said jacket is made of polyethylene, polypropylene, polyamide, and/or polyvinylidene difluoride (PVDF) preferably by rotomolding or by extrusion.

The present invention thus also provides the use of a rigid thermal insulation and/or buoyancy material of the invention, for insulating an undersea pipe or an undersea pipe element, and/or for providing buoyancy thereto.

More particularly, said undersea pipe element is a bent coaxial pipe junction element.

Still more particularly, said pipe conveys a hot fluid at a temperature lying in the range 20° C. to 80° C. in seawater at a temperature of less than 20° C., preferably less than 4° C., and preferably at a great depth of at least 1000 m.

Still more particularly, the present invention provides a thermally insulating undersea junction pipe constituted by coaxial pipes of the PiP type, as described in WO 2010/063922, providing a junction between two thermally insulating undersea pipe portions, said junction pipe comprising a rigid bent inner pipe, preferably made of steel, and presenting a radius of curvature that is three to ten times its outside diameter, preferably four to five times its outside diameter, and coated in a thermally insulating material, comprising:

an outer jacket surrounding said inner pipe, the jacket being made of flexible or semirigid material matching the bent shape of said inner pipe in coaxial manner; and the tubular wall of said outer jacket including structural reinforcing elements of annular or helical shape suitable for enabling said tubular wall of the outer jacket to be bent while keeping its cross-section substantially uniform, preferably substantially circular, and coaxial with the cross-section of said inner pipe, in spite of being bent to match the bent outline of said inner pipe with its said radius of curvature;

the junction pipe being characterized in that it includes:

a plurality of support elements, referred to as centralizer elements, made of rigid plastics or composite material interposed between said inner pipe and said outer jacket so as to keep the cross-sections of said outer jacket and said inner pipe substantially coaxial, said centralizer elements being spaced apart in the axial direction of said pipe at intervals of at least 1 m, preferably of at least 3 m to 10 m;

a plurality of longitudinal guide elements made of rigid or semirigid material placed at a substantially constant, and preferably constant, distance from the surface of the bent inner pipe, extending between two successive centralizer elements having the ends of said longitudinal guide elements resting on the peripheries thereof, preferably at least four of said guide elements being regularly distributed around the peripheries of said centralizer elements; and a rigid thermally insulating material of the invention completely filling the annular space between said inner pipe and said outer jacket.

BRIEF DESCRIPTION OF THE DRAWINGS

Other characteristics and advantages of the present invention appear in the light of the following detailed description given with reference to the following FIGS. 1 to 4, in which:

FIG. 4B is a longitudinal section of the pipe 16 fitted with coaxial floats 15, entirely filled with rigid insulating material of the invention 11 cast prior to curing in the enclosure 17 of the float, the jacket on the left being assembled in leaktight manner on the pipe 16 while empty and presenting a filler orifice 19, while the jacket on the right is full and plugged at 19a.

DETAILED DESCRIPTION OF THE PRESENTLY PREFERRED EMBODIMENTS

A general method of preparing a rigid insulating material of the invention, or GBG, and of putting it into place comprises the following successive steps:

1) mixing polyol with kerosene while stirring; and
2) adding isocyanate while stirring in a mass ratio of polyol/isocyanate lying in the range 30/1 to 35/1, corresponding to an NCO/OH molar ratio of 1 to 1.2, the polymer/kerosene mass ratio lying in the range 23/77 to 27/73, the above mixing operations being performed intimately under vacuum suction in order to obtain a homogeneous mixture of pasty fluid;
3) thickening the above non-cured homogeneous mixture with glass microbeads at a mass ratio of 75/25 to 65/35, under vacuum suction in order to obtain a pasty fluid mixture that is saturated with microbeads; and then
4) casing said mixture into a jacket that acts as a mold and surrounds the element that is to be insulated or made lighter (given buoyancy), and the material is allowed to rest, possibly while being stored to a temperature in the range 18° C. to 25° C., for a duration lying in the range 24 h to 72 h, until it has cured completely.

The function of the jacket is to insulate the rigid insulating material from ambient seawater at great depth so as to avoid migration of the plasticizer compound, possibly kerosene, into the ambient medium over the entire lifetime of the installation, i.e. a period of 25 years to 30 years, or even more.

In implementation examples 1 and 2 described below, the following ingredients are used:

PolyBd®45HTLO=hydroxylated polybutadiene of number mean molecular mass Mn equal to 2800, of polydispersity Mw/Mn=2.5, presenting a hydroxyl index of 47.1 milligrams (mg) of KOH per gram (/g), viscosity of 8000 millipascal seconds (mPa·s) at 23° C., and density of 925 kg/m$^3$, with a glass transition temperature of −75° C. This substance is sold by the supplier Crayvalley (France);

Isonate® 143 L, sold by the supplier Dow Chemical, =polymeric MDI presenting an NCO content equal to 29.2%, and viscosity at 25° C. equal to 33 centipoise (cps) (=33 mPa·s);

Ketrul® 211=deodorized kerosene sold by the supplier Total Fluides of the Total group (France); and microbeads having commercial reference S38XHS from the supplier 3M, constituted by Pyrex® type sodium aluminosilicate borosilicate glass, having a mean diameter of 10 μm to 40 μm, a wall thickness of about 1.5 μm, a true density of 380 kg/m$^3$, and in which more than 90% of the microbeads are capable of withstanding an external pressure of 5500 pounds per square inch (psi), i.e. substantially 38 MPa. The term "true" density is used to mean the density the microbeads on their own as contrasted to the density of a volume of 1 liter (L) filled with beads: since the beads come into contact with one another, there remains within such a 1 L volume, an empty volume between said microbeads: the density is then an apparent density, or "bulk density", which is then much less than the true density, but is not very meaningful with respect to the final compound of the invention.

Example 1

In order to obtain 1 cubic meter (m$^3$) of pasty fluid mixture of the insulating material of the invention, prior to curing, as obtained in step 4/ below, and of consistency that is sufficiently liquid to enable it to be put into place in the jacket, the following steps are performed:

1/ mixing 116.5 kilograms (kg) of PolyBd® with 350 kg of Ketrul® of density 810 kg/m³, and then evacuating and stirring for a few minutes;

2/ adding 19.2 kg of Inosate®, and continuing to mix under a vacuum for several minutes;

3/ incorporating 162 kg of glass microbeads and continuing to mix under a vacuum for several minutes until the material is in the form of a fluid paste; and 4/ pouring the fluid paste from step 3/ into the jacket, and then leaving it to rest for several hours or indeed several days until it has cured completely.

The corresponding volume ratios are 42.6% microspheres for 57.4% gel.

The cured insulating material of the present invention as obtained in this way, referred to herein as "GBG" has a density of 648 kg/m³, thereby giving buoyancy of 352 kg/m³ of GBG relative to fresh water, i.e. positive buoyancy of 363 kg/m³ of GBG in seawater having a specific gravity of 1.03 relative to fresh water.

The thermal conductivity of this rigid insulating material of the invention or GBG is about $\lambda=0.13$ W/m/K.

In comparison, an insulating gel made of the same polyurethane based on PolyBd® and Inosate® using the same ratio of Ketrul® 211, presents thermal conductivity of $\lambda=0.14$ W/m/K, and an insulating material of the syntactic foam type constituted by the same polyurethane based on PolyBd® and Inosate® (without Ketrul®), and having the same ratio of the same glass microbeads presents thermal conductivity $\lambda=0.17$ W/m/K to 0.18 W/m/K.

Example 2

In the same way, 1 m³ of pasty mixture prior to curing is obtained as in step 3/ above, but with a consistency that is more viscous by using the same process as described above to make 91.5 kg of PolyBd® with 274.5 kg of Ketrul®, and then 15.1 kg of Inosate®, followed by 209 kg of glass microbeads. The corresponding volume ratios are 55% microspheres for 45% gel.

The insulating material of the invention, known as GBG, as obtained after curing then has a density of 590 kg/m³, giving fresh water buoyancy of 410 kg/m³ of GBG, i.e. buoyancy of 422.5 kg/m³ of GBG in seawater having a specific gravity of 1.03. It can thus be observed that buoyancy increases by 16.4% compared with the more formulation of Example 1.

The thermal conductivity of this rigid insulating material of the invention or GBG is $\lambda=0.13$ W/m/K.

In comparison, an insulating gel and an insulating material of syntactic foam type constituted using the same polyurethane based on PolyBd® and Inosate® (without Ketrul®) and with the same ratio of the same glass microbeads for the syntactic foam, presents thermal conductivities of $\lambda=0.13$ W/m/K for the gel and $\lambda$ in the range 0.17 W/m/K to 0.18 W/m/K for the syntactic foam.

Example 3

With the two rigid insulating materials of the invention, or GBG, of Examples 1 and 2, a Young's modulus is obtained that is closed to 400 MPa at the end of the curing process, which then decreases asymptotically towards 250 MPa to 300 MPa after 10 or 20 years (accelerated aging tests).

The bulk modulus of GBG is about 2250 MPa.

In comparison, an insulating material of the syntactic foam constituted by the same polyurethane based on PolyBd® and Inosate®, without Ketrul® 211, and with the same ratio of the same glass microbeads, presents a Young's modulus lying in the range 200 MPa to 600 MPa and a bulk modulus having a value of about 1600 MPa.

In comparison, an insulating gel constituted by the same polyurethane based on PolyBd® and Inosate®, having the same ratio of Ketrul® 211, presents a bulk modulus with a value of about 1900 MPa and a Young's modulus that is practically zero, since it then behaves like a fluid.

Example 4

Figure 1:
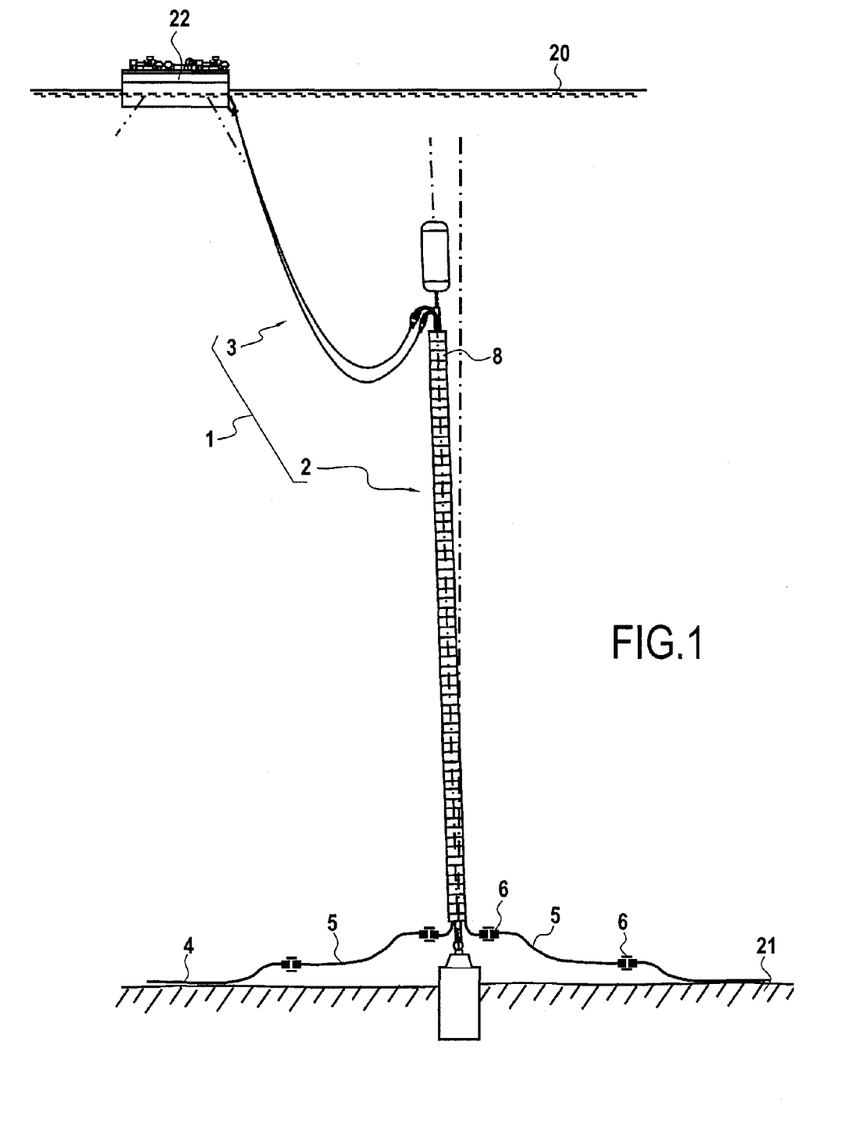
FIG. 1 shows a bottom-to-surface connection between a floating support 22 on the surface 20 and an undersea pipe 4 resting on the sea bottom 21, constituted by a hybrid tower 1 constituted by least one riser 2, constituted by a rigid pipe, and at least one flexible pipe 3 providing the connection between the top end of the riser(s) and said floating support 22, the junction(s) between the undersea pipe 4 and the bottom end(s) of the riser(s) 2 being made with the help of bent junction pipe(s) 5.
Figure 2:
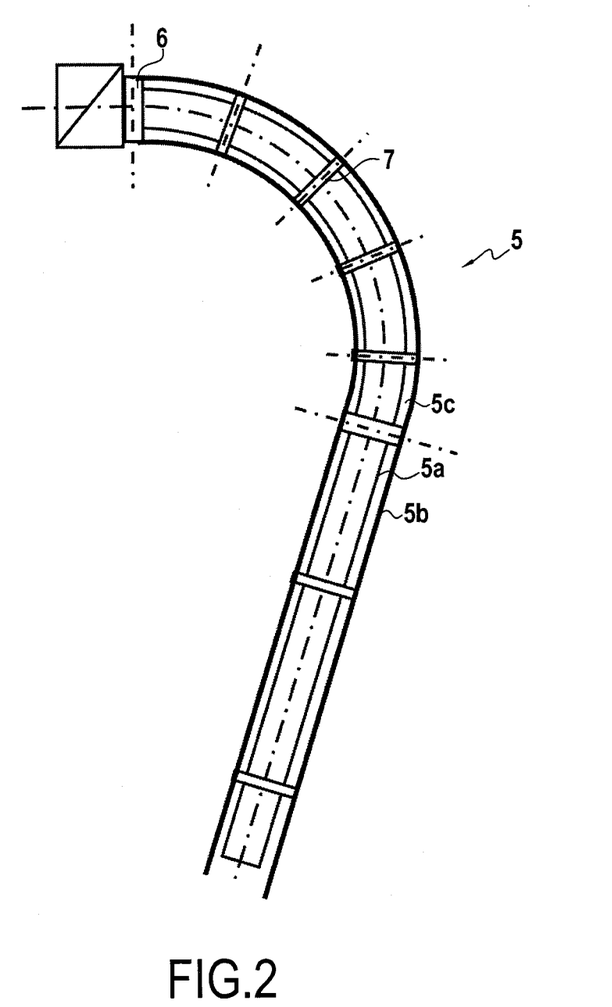
FIG. 2 shows an example of a portion of bent junction pipe constituted by two coaxial pipes.

The relatively more fluid formulation of the pasty mixture of step 3/ in Example 1 is more suitable for filling jackets defining small thickness of insulating material, in particular thicknesses lying in the range 3 centimeters (cm) to 10 cm, and/or to long lengths of insulating material, in particular lengths in the range 5 m to 20 m, as required for insulating coaxial bent junction pipes as described in patent WO 2010/063922 and as shown in FIGS. 1 and 2. Under such circumstances, the jacket of insulating material is constituted by the outside surface of the internal pipe 5a and the inside surface of the external pipe 5b, with the annular space 5c being closed at its longitudinal ends by plugs 6. Centralizer elements 7 are perforated so as to allow said pasty mixture of step 3/ to flow before it cures.

It should be observed that in this very particular type of application, it is the insulating nature of GBG that is more important than its buoyancy, thus justifying the use of a GBG of rather fluid consistency. It is necessary to make a compromise in terms of fluidity and thermal performance so as to guarantee that the GBG is put properly into place in this space that is narrow and long.

Example 5

Figure 3A:
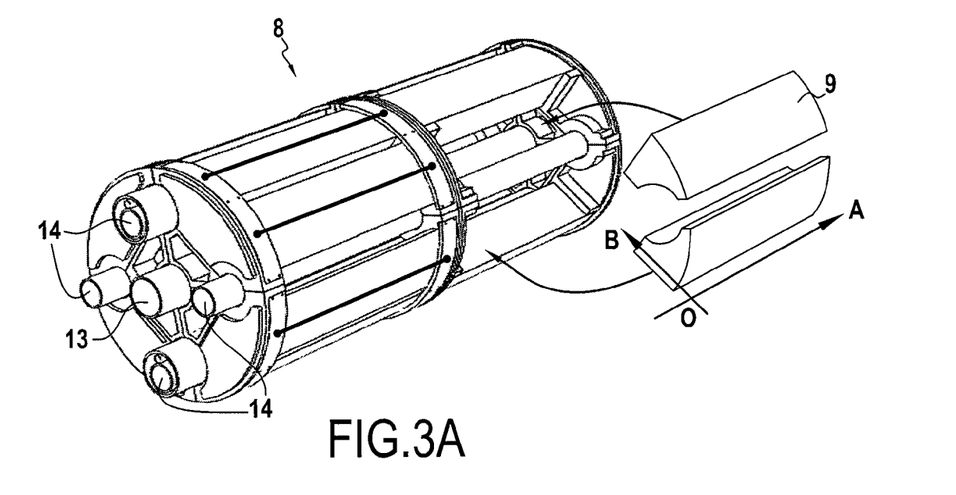
FIG. 3A shows a buoyancy module 8 suitable for sliding along said riser(s) 13 or 14, optionally including a central tension leg 13, said buoyancy module 8 being fitted with buoyancy elements in the form of a cylindrical-section shell 9.
Figure 3B:
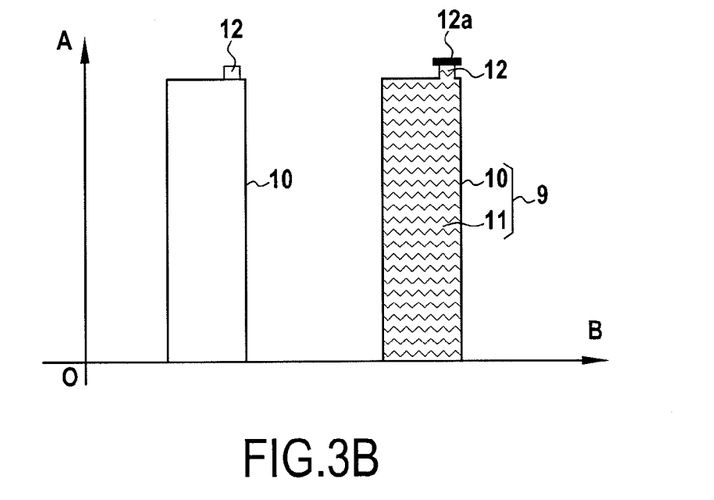
FIG. 3B is a longitudinal section view of a said buoyancy element shell 9 made of a rigid insulating material of the invention 11 and protected by a protective jacket 10, entirely filled with a said rigid insulating material 11 by casting through an orifice 12 that is closed by a plug 12a, said shell being shown empty on the left and full and plugged on the right.

The insulating materials or GBG of the present invention as obtained in Example 2 are more particularly useful for preparing buoyancy modulus 8, as shown in FIGS. 1 and 3A-3B that comprise preconstituted shells 9 containing an insulating material of the invention 11 cast in and protected by a jacket 10. The buoyancy modules 8 are for sliding around and insulating risers 2, 13, 14 of an installation as shown in FIG. 1, and as described in WO 2010/097528. These buoyancy modules 8 serve to obtain positive buoyancy distributed over portions of the length of pipes using a greater thickness of insulating material 11, in particular thickness lying in the range 10 cm to 30 m, but over lengths that are shorter concerning each buoyancy element 9, i.e. lying in the range 1 m to 10 m. The buoyancy modules 8 may be put into place on pipes equally well in a vertical position or in a horizontal position.

Example 6

Figure 4A:
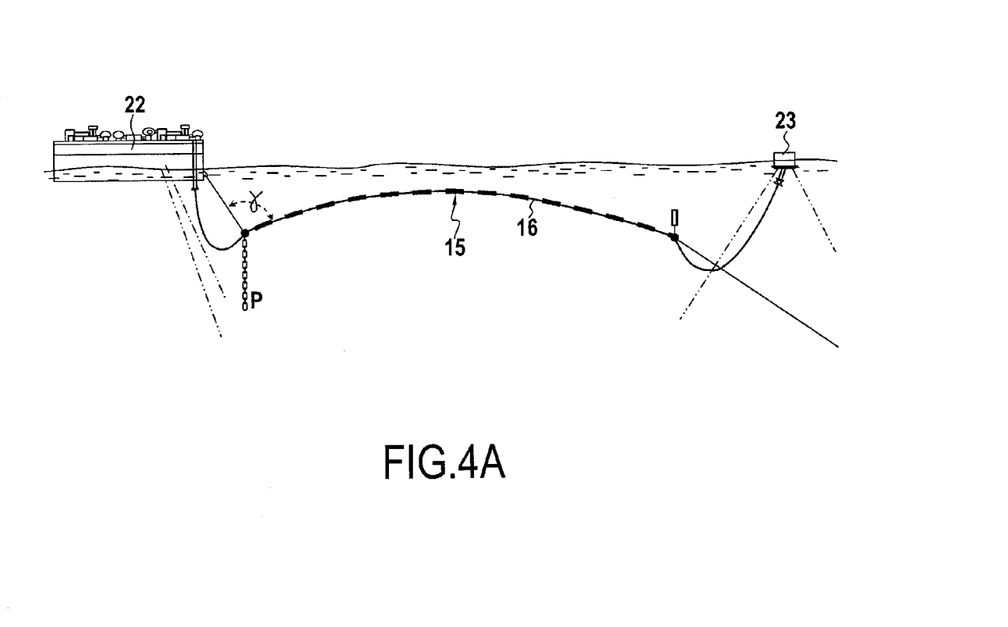
FIG. 4A shows an installation having an export pipe 16 between a floating support 22 and an offloading buoy 23, said export pipe 16 being fitted with coaxial floats 15.
Figure 4B:
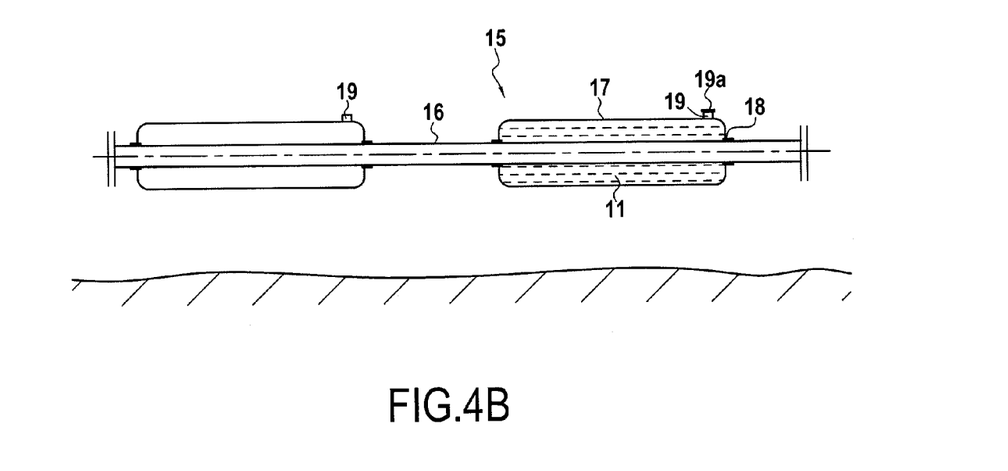

In another embodiment, as shown in FIGS. 4A and 4B, the pasty mixture of step 3/ in Example 2 is cast in situ into a float enclosure 15 constituted by a flexible or rigid tubular outer wall 17 that is closed and fastened in leaktight manner at its longitudinal ends 18 around the outside surface of an export pipe 16, thereby forming a leaktight enclosure between the pipe 16 and the inside wall of the jacket 17. The pasty mixture of step 3/ is cast into said float enclosure 15 through an orifice 19 that is closed by a plug 19a. This type of export pipe 16 is described in greater detail in WO 2006/120351 and WO 2009/138609.

In this type of export pipe, said pipe is at shallow depth, generally lying in the range 50 m to 100 m below the water surface: the pressure of the ambient medium then lies in the range 0.5 MPa to 1 MPa. It is then advantageous to use microspheres that present less strength against pressure than in above Examples 1 and 2. For this purpose, it is advantageous to use microspheres having the reference K20 (from 3M France). These microbeads have a true density of 200 kg/m$^3$, i.e. considerably smaller, but they also have a smaller maximum implosion pressure of 500 PSI (~3.5 MPa), which is entirely suitable for the depth at which export lines are installed. Thus, 1 m$^3$ of a pasty mixture is prepared having viscosity similar to that of Example 2, using 91.5 kg of PolyBd® and 274.5 kg of Ketrul®, followed by 15.1 kg of Inosate®, and then 110 kg of type K20 glass microbeads from 3M France. The corresponding volume ratios are 55% microspheres for 45% gel.

The insulating material of the invention, referred to as GBG, as obtained after curing then presents a density of 491 kg/m$^3$, thereby giving buoyancy in fresh water of 509 kg/m$^3$ of GBG, i.e. buoyancy of 524.5 kg/m$^3$ of GBG in seawater with a specific gravity of 1.03. It can thus be seen there is an increase in buoyancy of 44.5% relative to the more fluid formulation of Example 1, and an increase in buoyancy of 24.1% relative to the pasty formulation of Example 2.

Example 7

In the same way, for a bottom-to-surface connection as described with reference to FIG. 1, the buoyancy elements of the bottom portion of the riser column are advantageously made using high pressure microbeads (type S38XHS from 3M France) while the top elements are advantageously made using low pressure microbeads (type K20 from 3M France), with the intermediate elements advantageously being made using intermediate pressure microspheres available from the same supplier. This optimizes the cost of the buoyancy required for such an installation.

Example 8

Preferably, the jacket 10 or 17 of Examples 4 or 5 is made by rotomolding or extrusion so as to minimize the number of connections made by heat sealing, adhesive bonding, or by mechanical assembly, where any such method runs the risk of leading to leakage, and thus to polluting the ambient medium as a result of kerosene migrating. For this purpose, it is preferable to use thermoplastic materials that limit migration by percolation of the plasticizer compound, and more particularly of kerosene, e.g. a polyamide (PA) or a PVDF, where PVDF is particularly suitable for making said jackets.

When rotomolding with a polyamide or with PVDF, because of the high costs of the raw material, it is preferable to use rotomolding in two stages but on a continuous basis. Initially, the jacket is rotomolded with polyethylene (PE) or polypropylene (PP) so as to form the strong wall of the jacket (75% to 90% of the thickness of said wall), and then once the PE/PP wall has melted completely and stuck to the wall of the mold, a second charge of PA/PVDF is inserted and rotomolding is continued until the wall is constituted in full being made of two layers presenting, going from the outside towards the inside: an outer first layer of PE/PP representing substantially 75% to 90% of the final thickness; and an inner second layer of PA/PVDF representing substantially 25% to 10% of the final thickness. The jacket is thus made at lower cost and it presents good mechanical strength (PE/PP) while also presenting a barrier that limits or even eliminates percolation of the plasticizer compound and more particularly of kerosene to the outside, thereby not harming the ambient medium, i.e. the sea bottom and its fauna.

Example 9

The description above relates using kerosene as the liquid plasticizing insulating compound, however it is also possible to use a lighter fuel, such as gasoline, since that presents a lower density of 750 kg/m$^3$, a bulk modulus of about 2100 MPa, i.e. similar to that of kerosene, and thermal conductivity of 0.07 W/m/K, i.e. that is very low, thereby leading to an insulting rigid compound of the invention that has mechanical performance that is similar, but insulating performance and buoyancy that are greatly improved. However, because of the flashpoint of gasoline, which flashpoint is very low (−43° C.), the fabrication method is more dangerous because of the risk of explosion, and as a result does not constitute the preferred version of the invention.

The invention claimed is:

1. A rigid thermal insulation and/or buoyancy material that is constituted by a mixture of:
    a) a matrix of a homogeneous mixture of cured elastomer polymer and a liquid insulating plasticizer compound, said insulating plasticizer compound being selected from compounds derived from mineral oil, and compounds derived from vegetable oils, said insulating plasticizer compound not being a material of the type that changes phase at a temperature lying in the range −10° C. to +150° C., the mass proportion of said plasticizer compound in said matrix being at least 50%; and
    b) hollow beads, dispersed within a said matrix of said homogeneous mixture of said polymer and said insulating plasticizer compound, at a proportion by volume of at least 35% of the total volume of the mixture of said beads with said matrix.

2. The material according to claim 1, wherein the mass proportion of said plasticizer compound in said matrix being at least at least 60%; and said hollow beads are glass microbeads dispersed within a said matrix of said homogeneous mixture of said polymer and said insulating plasticizer compound, at a proportion by volume of lying in the range 40% to 65% of the total volume of the mixture of said beads with said matrix.

3. The material according to claim 1, wherein said plasticizer compound presents a bulk modulus greater than that of said polymer, and thermal conductivity, and also density, that are less than those of said polymer.

4. The material according to claim 2, wherein said plasticizer compound presents a bulk modulus greater than 2000 MPa, and said thermal conductivity is less than 0.12 W/m/K and said density is less than 850 kg/m$^3$.

5. The material according to claim 1, wherein:
    the mass ratio of said cured polymer and said insulating plasticizer compound lies in the range 15/85 to 40/60; and
    the volume ratio of said beads relative to the volume of said matrix of cured polymer and said insulating compound lies in the range 35/65 to 65/35.

6. The material according to claim 5, wherein:
    the mass ratio of said cured polymer and said insulating plasticizer compound lies in the range 20/80 to 30/70; and
    the volume ratio of said beads relative to the volume of said matrix of cured polymer and said insulating compound lies in the range 45/55 to 57/43.

7. The material according to claim 1, wherein said cured polymer is of the polyurethane type and said liquid plasticizer compound is a petroleum product, known as a fuel type light cup.

8. The material according to claim 1, wherein said plasticizer compound is selected from one of kerosene, gasoil, gasoline, and white spirit.

9. The material according to claim 1, wherein said cured polymer is a polyurethane resulting from polyaddition crosslinking of hydroxylated polydiene, and of aromatic polyisocyanate.

10. The material according to claim 1, wherein said material is confined in a protective jacket.

11. The material according to claim 1, wherein said material is in the form of a premolded part capable of withstanding underwater hydrostatic pressure at a great depth of at least 1000 m.

12. The material according to claim 1, wherein said rigid insulating material presents: density of less than 700 kg/m$^3$, and thermal conductivity of less than 0.15 W/m/K; with a Young's modulus or three-axis compression modulus lying in the range 100 MPa to 1000 MPa, and a bulk modulus greater than 2000 MPa.

13. The material according to claim 12, wherein said rigid insulating material presents: density of less than 600 kg/m$^3$, and thermal conductivity of less than 0.15 W/m/K; with a Young's modulus or three-axis compression modulus lying in the range 200 MPa to 500 MPa, and a bulk modulus greater than 2200 MPa.

14. The material according to claim 1, wherein said beads are in direct contact against one another, said beads being coated entirely over their outside surfaces in full in at least a film of the mixture of said matrix, said mixture fully occupying the gaps between said beads.

15. The material according to claim 1, wherein said cured polymer is a polyurethane resulting from polyaddition crosslinking of hydroxylated polybutadiene, and of 4,4'-diphenyl-methane-diisocyanate (MDI) or a polymeric MDI.

16. A method of preparing a material according to claim 1, wherein the following steps are performed:
   1/ mixing said insulating liquid compound and the monomers and/or prepolymers suitable for reacting to form said cured polymer, until a homogeneous mixture is obtained, to obtain a degassed mixture;
   2/ mixing said homogeneous mixture of step 1/ with said beads to obtain a homogeneous mixture with said beads, and
   3/ leaving said homogeneous mixture with said beads of step 2/ to rest until completely cured in order to form said rigid thermally insulating material.

17. The method according to claim 16, wherein in step 3/, the following successive steps are performed:
   3a/ casting or injecting said homogenous mixture with said beads of step 2/ into a jacket acting as a mold or into a space formed by a) the outside surface of a pipe element or an undersea pipe to be insulated and/or for which it is desired to increase buoyancy, and b) the inside surface of a said protective jacket; and then
   3b/ leaving said mixture to rest in said jacket until it has cured and solidified completely in situ.

18. A method of using a rigid thermal insulation and/or buoyancy material, said material constituted by a mixture of:
   a) a matrix of a homogeneous mixture of cured elastomer polymer and a liquid insulating plasticizer compound, said insulating plasticizer compound being selected from compounds derived from mineral oil, and compounds derived from vegetable oils, said insulating plasticizer compound not being a material of the type that changes phase at a temperature lying in the range 10° C. to 150° C., the mass proportion of said plasticizer compound in said matrix being at least 50%; and
   b) hollow beads, dispersed within a said matrix of said homogeneous mixture of said polymer and said insulating plasticizer compound, at a proportion by volume of at least 35% of the total volume of the mixture of said beads with said matrix;
   said method comprising applying said material around an undersea pipe or an undersea pipe element, for insulating said pipe or pipe element and/or for providing buoyancy thereto.

19. The method according to claim 18, wherein said undersea pipe element is a bent coaxial pipe junction element.

20. The method according to claim 18, wherein said pipe conveys a hot fluid at a temperature lying in the range 20° C. to 80° C. in seawater at a temperature of less than 20° C.

21. The method according to claim 16, wherein said step 3/ further comprises with stoving said homogeneous mixture with said beads at a temperature in the range 18° C. to 30° C. for at least 24 hours.

* * * * *